United States Patent [19]

Benesi

[11] Patent Number: 5,059,318
[45] Date of Patent: Oct. 22, 1991

[54] FLUID SEAL FOR A TRAVELING SHEET FILTER PRESS

[76] Inventor: Steve C. Benesi, 1201 Vallejo Ave., Suite 5, Novato, Calif. 94945

[21] Appl. No.: 522,684

[22] Filed: May 14, 1990

[51] Int. Cl.$^5$ .......................................... B01D 29/09
[52] U.S. Cl. .................................. 210/227; 210/231; 210/387
[58] Field of Search ............... 210/225, 227, 231, 387, 210/398, 406, 445, 399; 277/3, 15, 16

[56] References Cited

U.S. PATENT DOCUMENTS

| | | | |
|---|---|---|---|
| 3,437,210 | 4/1969 | O'Neill | 210/387 |
| 3,443,695 | 5/1969 | O'Neill | 210/387 |
| 3,499,532 | 3/1970 | Schneider | 210/387 |
| 3,608,734 | 9/1971 | Schneider | 210/387 |
| 4,233,157 | 11/1980 | Miller | 210/406 |
| 4,267,060 | 5/1981 | Miller | 210/406 |
| 4,664,813 | 5/1987 | Schneider | 210/771 |

*Primary Examiner*—Robert A. Dawson
*Assistant Examiner*—Matthew O. Savage
*Attorney, Agent, or Firm*—George W. Wasson

[57] ABSTRACT

In a filtering device used for filtering slurries, or the like, and employing pressed together plate members separated by a filter media, there has been a problem in sealing the mating surfaces of the pressed together plates. In accord with the present invention a groove is provided on each of the plate members at their mating surfaces with the grooves at least partially aligned with each other. A fluid connection is provided to each of the grooves and a fluid at a desired pressure is separately applied to each of the grooves. The fluid pressures in each of the two grooves is different and selected to prevent leakage of slurry or slurry filtrate between the pressed together plates.

9 Claims, 1 Drawing Sheet 5,059,318

FLUID SEAL FOR A TRAVELING SHEET FILTER PRESS

This invention relates to apparatus for removing liquids from slurry materials and more particularly to effective structures for preventing fluid leakage between mating surfaces of plates of a slurry filter apparatus.

BACKGROUND OF THE INVENTION

In many industrial processes and in fluid production systems, a slurry of solids suspended in a liquid is produced and it becomes necessary to separate the solids from the liquids so that each material may be treated in ways that will make disposal of the treated materials both economical and environmentally effective. In most such processes or systems, the slurry material is fed to a filter apparatus in the form of at least a pair of plate members with internal space separated by a filter media of some form. The plate members are pressed together at mating surfaces with the filter media between the mating surfaces and spread across the interior space separating the upper plate from the lower plate. Slurry materials are fed into the upper plate and filtrate liquids are taken away from the lower plate leaving behind the solids of the slurry accumulated on the filter media. After a sufficient amount of slurry has been treated to accumulate solid materials, the plates are separated and the filter media is replaced and the filtration process is repeated with a clean filter media. The filtrate fluid and solids are then separately treated or disposed of in an acceptable manner.

In some slurry filtering processes the fluid carrier in the slurry is toxic or noxious so that it is desirable to avoid leakage of the slurry or the filtrate to the outside of the mating surfaces of the plates. Many systems of pressing the mating surfaces together have been suggested, but none so far seem to be effective. Several examples of the systems for sealing the mating surfaces have suggested formations at the mating surfaces of filter plates with air or liquid pressure supplied to those formations to prevent fluid flow and others have suggested applying vacuum to the suggested formations. Such systems and formations are shown in U.S. Pat. No. 3,443,695 where a groove is formed in the mating surface of the lower plate and air or liquid pressure or vacuum is supplied to the groove; U.S. Pat. No. 3,499,532 where two grooves are provided in the mating surface of the lower plate with one groove having a pressure higher than atmospheric and the other open the the atmosphere; U.S. Pat. No. 3,608,734 where a groove is formed in the mating surface of the upper plate and a vacuum is supplied to that groove; U.S. Pat. No. 4,267,060 where a groove is formed in the mating surface of the lower plate and a fluid (filtrate or inert gas) is supplied to the groove; and U.S. Pat. No. 4,664,813 where a groove is formed in the mating surface of the upper plate and air, under pressure, is supplied to the groove. None of these systems is completely effective in preventing leakage of fluids through the mating surfaces of the pressed together plates of a filter apparatus.

Most prior art systems where leakage occurs at the mating surfaces have resorted to impregnating the edges of the of the filter media to function as a gasket at the mating surfaces; however, even when used with the grooves of the prior art the prevention of leaking has been ineffective. Others have suggested O-rings or other gasket materials, but those systems are difficult to align and are still ineffective.

It is an object of the present invention to provide a formation of the mating surfaces of pressed together plates of a filter apparatus in a manner to substantially eliminate leakage between the mating surfaces.

A further object in accord with the preceding object is to provide a set of grooves in the mating surfaces that will permit the application of fluid pressures that will prevent leakage between the surfaces.

A further object in accord with the preceding objects is to provide mating grooves in the mating surfaces of pressed together plates with a fluid under pressure supplied to one groove and a fluid under vacuum applied to the other.

SUMMARY OF THE INVENTION

In accordance with the concept of the present invention, there are aligned and mating continuous grooves formed in the mating surfaces of the plates of a filter apparatus with the grooves supplied with differential pressured fluids that will prevent and/or accumulate any leakage liquids that attempts to pass along the faces of the mating surfaces. The grooves in each of the mating surfaces extend along the entire peripheral surface of that plate. A fluid connection is made to the groove in the upper plate for supplying a fluid, gas or liquid, to that groove. An air passage connection is made to the groove in the lower plate for supplying a fluid, gas or liquid, at a pressure related to the pressure in the groove in the upper plate. A porous filter media is placed between the plates at the mating surfaces and the plates are pressed together to seal the media in place. The porous filter media separates the interior of the upper plate from the interior of the lower plate so as to accumulate solids from a slurry passed through the pressed together plates. The pressures supplied to the grooves in the upper and lower plate mating surfaces is effective with the filter media to prevent leakage of fluids from the inside of the filter apparatus to the outside of the filter apparatus.

These and further objects and features of the present invention will be readily apparent to those skilled in the art from the appended drawings and specification illustrating a preferred embodiment wherein:

DETAIL DESCRIPTION OF THE INVENTION

Figure 1:
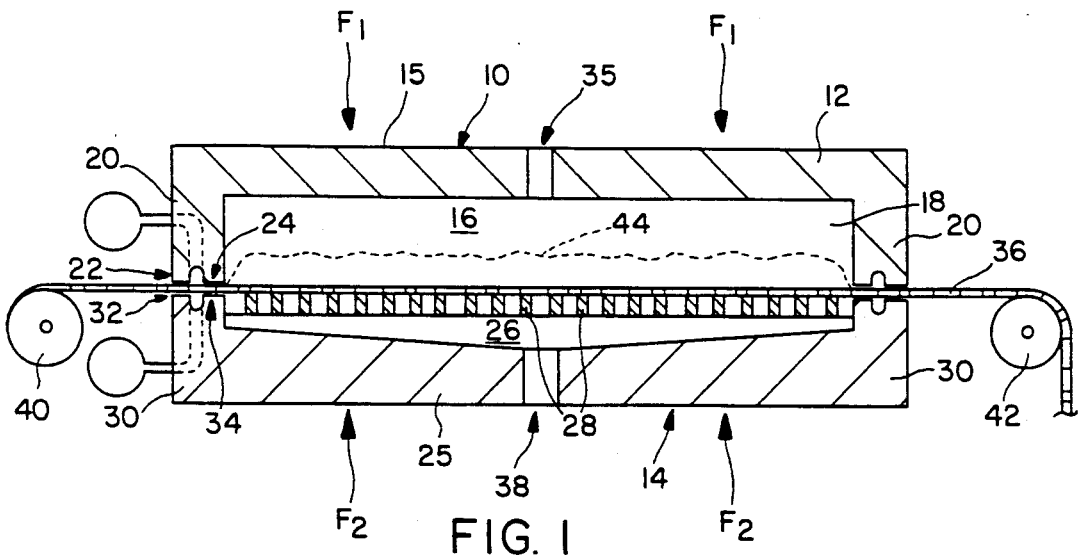
FIG. 1 is a side elevation and section view of representative filter apparatus elements showing the mating surfaces of upper and lower plates and the filter media.

As shown in FIG. 1, a conventional filter apparatus 10 of the type on which the present invention is effective includes an upper plate member 12 and a lower plate member 14 which are pressed together by forces represented by arrows F1 and F2. It should be understood that the forces F1 and F2 are uniformly applied around the entire peripheral surfaces of the filter plates to attempt to accomplish a complete sealing of the filter apparatus. The plates 12 and 14 may take any form in periphery but are usually rectangular or circular.

The upper plate member 12 has a cover portion 15 and an open interior 16 defining the upper portion of a closed chamber 18 within the filter apparatus. The sidewalls 20 of the upper plate extend from the cover portion 15 to enclose the chamber 18 and the sidewalls terminate in lower edges 22 extending inwardly and defining the mating surface 24 of the upper plate.

The lower plate member 14 has a bottom portion 25, a closed interior chamber 26 and recessed areas usually in the form of a grid or plate 28 with openings through which fluids may pass. The sidewalls 30 of the lower plate enclose the chamber 26 and terminate in upper edges 32 extending inwardly and defining the mating surfaces 34 of the lower plate.

The upper plate has an opening 35 for the entry of slurry materials into the closed interior chamber 18 and the lower plate has an opening 38 connected to the closed interior chamber 26 and to the fluid passageways through the grid 28. Between the mating surfaces 24 and 34 a porous filter media 36 is positioned so as to extend across the closed chamber 18 and rest on the grid 28. The filter media 36 is shown as a continuous strip that enters from coil 40 and exits over roller 42.

In basic operation, the upper plate member 12 is pressed against the lower plate member 14 by forces represented by F1 and F2 with a porous filter media 36 between the plates. The filter apparatus of FIG. 1 takes input slurry materials entering at opening 35 and filters that slurry through the filter media 36 to separate solids from liquids and to retain the solids as a filter cake 44, as shown in dotted lines in FIG. 1, and passes the filtrate through the filter media 36 to the exit opening 38 for disposal or further treatment.

Figure 2:
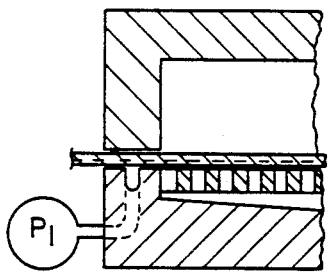
FIGS. 2,3,4 and 5 are partial sectional views of mating surfaces showing the prior art systems.

As previously stated, a problem with filter apparatus of the type shown is the leakage of filtrate or liquids from the slurry between the mating surfaces of the pressed together plate members. Prior art methods to correct that leakage have used a groove in the upper surface of the lower plate as shown in FIG. 2 and the application of a vacuum to that groove as represented by P1 in that figure. This system has had some success when used with a single thin sheet of filter media or a thin septum used with filter aids such as diatomatious earth, perlite or Fuller's Earth. It is not effective when used with thick filter media or multiple layers of filter media.

Figure 3:
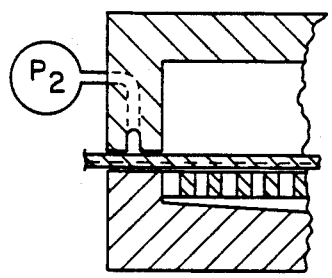

Another suggested solution to the leakage problems is as shown in FIG. 3 where a single continuous groove is provided in the lower surface of the upper plate and the application of compressed air to the groove and the use of a gasket member on the upper surface of the lower plate. This modification of the mating surfaces has not been effective in eliminating the leakage whether the filter media is a single or double layer or supplemented with other additions of filter media, such as paper filters typical of "coffee" filter paper.

Figure 4:
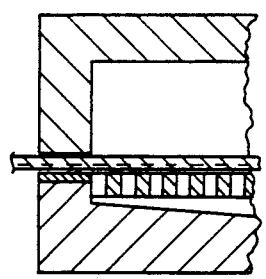

FIG. 4 shows the use of a gasket between the mating surfaces of the plate members and this form has been used with filter media that includes the impregnation of the edges of the media with an elastomer and the placement of that impregnated edge between the mating surfaces of the plate members. This alternative has also been ineffective in preventing leakage between the plate members.

Figure 5:
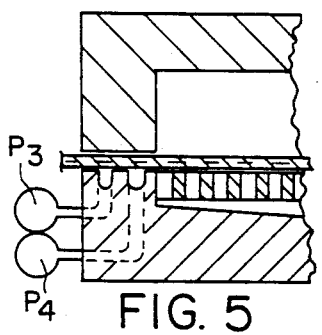

FIG. 5 shows another adaptation of the grooves in the mating surfaces wherein a pair of grooves are provided in the face of one of the plate members, in this case the lower plate member, with one of the grooves supplied with a pressure greater than atmospheric as represented by P3 and the other groove supplied with a pressure P4 at atmospheric pressure. This adaptation would not appear to be effective in eliminating the leakage between the filter plates.

Figure 6:
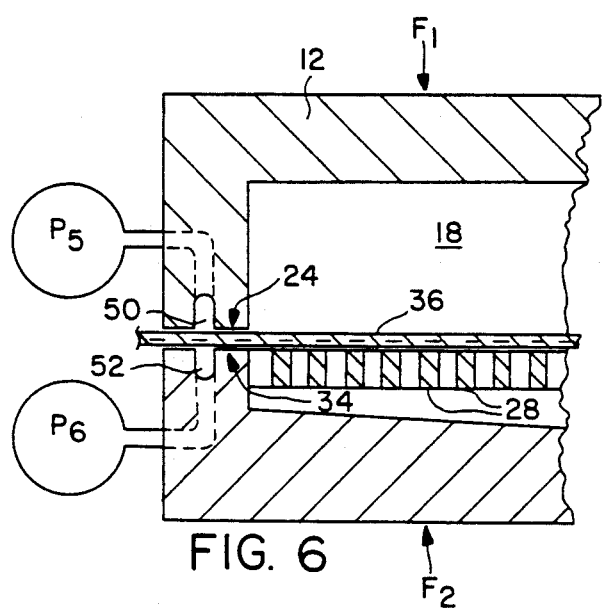
FIG. 6 is a partial sectional view showing the improvement of the present invention.

FIG. 6 shows the present invention as applied to the plate members of a filter apparatus. As shown, the lower mating surface 24 of the upper plate member 12 is formed with a groove at 50 and a fluid connection is made to that groove to establish a desired pressure within the groove as represented by P5. The groove 50 extends around the entire periphery of the mating surface 24 so that the entire surface has a groove at the first pressure. The upper mating surface 34 of the lower plate member 14 is formed with a groove at 52 and a fluid connection is made to that groove to establish a desired pressure within that groove as represented by P6. The groove 52 extends around the entire periphery of the mating surface 34 so that the entire surface has a groove at the second pressure. P5 and P6 are related to each other such that P5 is greater than P6 except where the pressures are the same in both upper and lower grooves or when they are at vacuum. The filter media is positioned between the mating surfaces so as to be positioned between the grooves 50 and 52. In a preferred arrangement, the grooves 50 and 52 are directly aligned so that their edges mate with each other; however, the grooves may be offset so that only a portion of the grooves mate.

P5 and P6 are related such that P5 is greater than P6 and P6 may be a vacuum or P5 may be at some pressure at least atmospheric pressure. This form will be effective if P5 were at a pressure above atmospheric and P6 were at atmospheric pressure.

The fluid connection to grooves 50 and 52 may be a liquid or a gas at the desired pressures P5 and P6. In the preferred form, the fluid connection is air or an inert gas.

It has been demonstrated that with the application of a fluid connection to the grooves 50 and 52 at a pressure in the range of 5 to 125 psig is effective and also that pressure differentials between the pressure within the chamber 18 and P5 and P6 in the range of 15 to 30 psig is optimum. The difference in pressure between P5 and P6 is in the range of 0 to 30 psig with an optimum difference in those pressures of 5 to 20 psig. In another application, P5 may be equal to P6 and both P5 and P6 are greater than the input pressure of the slurry fluid.

With the filter apparatus in the form shown in FIG. 6 it is possible to use a single or multiple layer filter media 36 without an impregnated edge and without a gasket material between the mating surfaces and the filter media. It has also been demonstrated that compressed air or a gas may be supplied to the upper groove 50 and a lesser pressure air or gas at the lower groove 52 with the lower groove 52 draining to atmospheric pressure. The application of a vacuum pressure to the lower groove 52 is further effective in removing any possible leakage fluids from between the mating surfaces. It is further possible to use vacuum pressure connections to both the upper groove 50 and the lower groove 52 with a differential pressure between the vacuum gases placing the lower groove 52 at a lower pressure. Leakage can also be prevented by using pressure gases in the upper groove and the lower groove with a differential pressure between the two grooves that will cause any possible leakage to pass through the lower groove.

While the description has referred to the connection of a fluid passage to the upper and lower grooves it should be under stood that the fluid may be air, an inert gas or a liquid.

The grooves 50 and 52 are shown as arcuate and are most easily formed by using a half-cylinder milling tool passing around the entire periphery of the surfaces 24 and 34. It should be understood that the form of the grooves is not critical to this invention and that squared walled grooves, trapeziodal grooves or triangular grooves are workable and can be machined into the surfaces.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. In a slurry filtering device for filtering a slurry at a pressure above atmospheric pressure comprising at least a pair of upper and lower plate members with a sheet of porous media therebetween, said upper and lower plate members having recessed portions defining respective chamber areas and being movable together to form a closed chamber within said filtering device, means for providing input liquid slurry to said closed chamber at a pressure above atmospheric pressure, said upper member having a cover portion with an opening into said chamber for receiving said slurry to be filtered, peripheral sidewalls extending from the periphery of said cover portion of said upper plate member to define an upper portion of said closed chamber, said peripheral sidewalls defining a lower edge of said upper plate member, and said lower member having a bottom portion and peripheral walls defining an upper edge of said lower plate member to define a lower portion of said closed chamber, said upper edge of said lower plate member being positioned to support said peripheral sidewalls of said upper member, recessed areas within said lower plate member for trapping liquids passing through said sheet of porous media and extracted from said slurry, and an exit port from said lower plate member for removing said liquid extracted from said slurry in said closed chamber, and means for pressing said upper and lower plate members toward each other to mate said lower edge of said upper plate member and said upper edge of said lower plate member to establish said closed chamber and to secure said porous media between said plate members, the improvement in sealing the mating surfaces between said upper and lower plate members comprising:

a) said lower edge of said peripheral sidewalls of said upper plate member having a finite width sealing surface extending toward the interior of said chamber area of said upper plate member, said sealing surface extending along the entire lower edge of said upper plate member, b) an open groove in said sealing surface of said upper plate member at said finite width and extending around the entire periphery of said sealing surface, c) fluid passage means connected to said open groove in said sealing surface of said upper plate, d) said upper edge of said lower plate member having a finite width sealing surface extending toward the interior of said chamber area of said lower plate member, said sealing surface extending along the entire upper edge of said lower plate member, e) an open groove in said sealing surface of said lower plate member at said finite width and extending around the entire periphery of said sealing surface, said open groove in said lower plate member being positioned to be aligned with said open groove in said upper plate member, f) fluid passage means connected to said open groove in said sealing surface of said lower plate member, fluid supply means connected to said fluid passage means in said upper and lower plate members for supplying fluid at a higher pressure to the open groove in said upper plate member than to the open groove in said lower plate member.

2. The slurry filtering device of claim 1 wherein said fluid supply means supplies fluid to said open groove in said upper plate member at a pressure above atmospheric pressure and supplies fluid to said open groove in said lower plate member at a pressure below atmospheric pressure.

3. The slurry filtering device of claim 1 wherein said fluid supply means supplies fluid to said open groove in said lower plate member at a pressure below atmospheric pressure.

4. The slurry filtering device of claim 1 wherein said fluid supply means supplies fluid to said upper plate member at a pressure above atmospheric pressure.

5. The slurry filtering device of claim 4 wherein said fluid supply means supplies fluid to said open groove in said upper plate member at a pressure above the pressure of said input liquid slurry.

6. The slurry filtering device of claim 5 wherein said fluid supply means supplies fluid to said open groove in said lower plate member at a fluid pressure above atmospheric pressure, and said fluid supply means supplies fluid to said groove in said upper plate member at about 15 to 30 psig above the pressure of the input liquid slurry in said closed chamber.

7. The slurry filtering device of claim 4 wherein the difference in pressure between the fluid pressure in said open groove in said upper plate and said fluid pressure in said open groove in said lower plate is 5 to 20 psig.

8. The slurry filtering device of claim 1 wherein said fluid supply means supplies fluid to said open groove in said upper plate member at a pressure below atmospheric pressure.

9. The slurry filtering device of claim 1 wherein said fluid supply means supplies fluid in the form of a gas to said open grooves in said upper and lower plate members.

* * * * *